Oct. 14, 1958   L. R. ALLDREDGE   2,856,581
MAGNETOMETER
Filed May 27, 1952
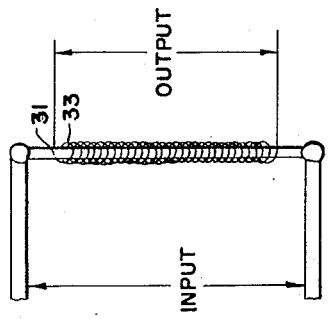
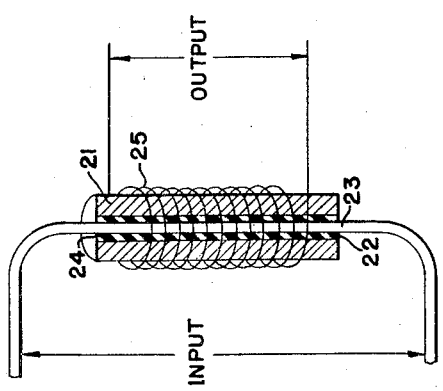
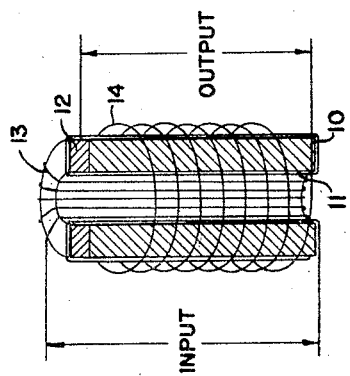
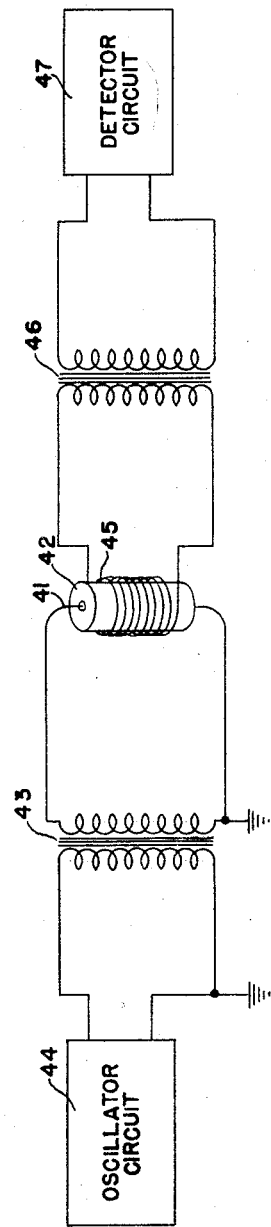
INVENTOR
LEROY R. ALLDREDGE
BY
ATTORNEYS United States Patent Office 2,856,581
Patented Oct. 14, 1958

2,856,581

MAGNETOMETER

Leroy R. Alldredge, Kensington, Md.

Application May 27, 1952, Serial No. 290,373

4 Claims. (Cl. 324—43)

(Granted under Title 35, U. S. Code (1952), sec. 266)

The invention described herein may be manufactured and used by or for the Government of the United States of America for governmental purposes without the payment of any royalties thereon or therefor.

This invention comprises novel and useful improvements in magnetometers and more particularly pertains to a magnetometer of the saturable reactor type in which the exciting field is applied transverse to the field to be measured.

The magnetometers of the saturable reactor type heretofore used require that the exciting field of fundamental frequency and the field to be measured be applied along the axis of the sensitive magnetic element. Such magnetometers produced an output voltage of odd harmonic frequency in the absence of an external field parallel to the axis of the sensitive element, and a voltage of odd and even harmonic frequencies in the presence of an external field. In order to accurately detect the even harmonic frequencies in the output which are correlative with the external field, complex filters must be provided in the excitation circuit so that only currents of fundamental frequency are used to excite the core and further filters must be provided to separate the even harmonic components in the output thereof. Additionally, the ends of the core produced undesirable demagnetizing effects in the excitation field thereby increasing the problem of producing saturation in the core.

The magnetometer of the present invention, in which the exciting field is applied at right angles to the field to be measured, offers several advantages over the older saturable reactor magnetometers. All odd harmonics are automatically suppressed, thereby obviating the necessity of complex filters in the excitation circuits and in the output circuits. Additionally, the exciting field does not work against demagnetizing effects.

An important object of this invention is to provide a sensitive magnetometer of small size which operates on low excitation power.

Another object of this invention is to provide a magnetometer the output of which is zero when the external field being measured is zero and which output contains only even harmonic voltages when the external field is not zero thereby obviating the necessity of filters in the excitation circuit and the output circuit of the magnetometer.

Another object of this invention is to provide a magnetometer in which the excitation field is applied transverse the field to be measured, which magnetometer produces an output voltage correlative in amplitude and phase with the magnitude and sign of the external field being measured.

Other objects and many of the attendant advantages of this invention will be readily appreciated as the same becomes better understood by reference to the following detailed description when considered in connection with the accompanying drawings wherein:

Fig. 1 is a diagrammatic view illustrating one form of transflux magnetometer employing an excitation coil wound in toroidal fashion about a cylindrical core;

Fig. 2 is a diagrammatic view illustrating a second form of transflux magnetometer employing a cylindrical core having an axial excitation conductor extending therethrough;

Fig. 3 is a diagrammatic view of a third form of transflux magnetometer employing a magnetic wire as the sensitive element; and Fig. 4 is a diagrammatic view illustrating a magnetic detection system of the type to which the magnetometer of this invention is applicable.

Magnetometer systems of the saturable reactor type generally employ a core of saturable magnetic material having excitation windings thereon energized from a source of alternating current of fundamental frequency. The windings in the magnetometers heretofore known are arranged on the core in such a manner as to produce an exciting field parallel to the axis of the core, and such devices are hereinafter referred to as longitudinal magnetometers. The excitation winding or a separate coil disposed about the core is used as a pick-up coil, and, in the absence of an external field, the output of the longitudinal type magnetometer is a voltage of odd harmonic frequency. When an external field is applied parallel to the core, the output of the longitudinal magnetometer includes, in addition to the odd harmonic frequency voltages, voltages of even harmonic frequency which are correlative in magnitude with the applied external field. Satisfactory operation of such longitudinal magnetometers thus requires a complex filtering system to insure that only exciting currents of fundamental frequency are applied to the excitation windings and further filtering systems must be provided to separate the even harmonic frequency voltages from the odd harmonic voltages in the output thereof. Additionally, the free ends of the core in the longitudinally excited magnetometer produce demagnetizing effects which necessitates great excitation power for the exciting windings than is necessary if a closed magnetic path were presented to the excitation flux.

In the present invention, an elongated core is circularly magnetized in a direction at right angles to the core axis. Since a closed magnetic loop is thus presented to the excitation flux, the circularly magnetized magnetometer has no demagnetizing effects in contrast to the longitudinal magnetometer. Thus, the circularly magnetized magnetometer, hereinafter referred to as a transflux magnetometer, requires relatively less excitation power than a longitudinal magnetometer thereby rendering the transflux magnetometer particularly adapted for use in which low power requirements are of prime consideration.

When the core of the transflux magnetometer is circularly magnetized, as by the passage of an alternating current through windings which extend longitudinally of a hollow cylindrical magnetic core or by the passage of an alternating current through a magnetic conductor which is employed in the core, the magnetic domains within the core reverse direction during each half cycle of the exciting current in random fashion so that the coupling with a pick-up coil disposed on the core is zero. If, however, an external field is applied axially of the core, there is a preferred direction through which the magnetic domains will rotate as the exciting current changes polarity which produces a coupling with the pick-up coil. The resulting voltage detected by the pick-up coil is thus a measure of the externally applied field.

The magnetization curve may be assumed to be of the form:

[1] $\quad B = b_1 h + b_3 h^3 + b_5 h^5 + b_7 h^7 + \ldots$ where the $b$ coefficients are determined by the shape and material of the core, and $h$ is the magnitude of the total magnetic field.

The excitation field $H_0 \cos wt$. in applied transverse the axis of the core whereas the field $H$ being measured is applied along the axis of the core. The total field $h$ is therefore expressed by the following equation:

[2] $\quad h = [H_0^2 \cos^2 wt. + H^2]^{1/2}$

Since, in the case of the transflux magnetometer, only the component of the flux $B$ along the core axis is effective to produce a voltage in the pick-up coil, the desired flux $B_a$ along the axis of the core is:

[3] $\quad B_a = B \sin \theta = \dfrac{BH}{h}$

Where $\theta$ is the angle between the excitation field $H_0 \cos wt$. and the total field $h$. Substituting Equations 1 and 2 in Equation 3:

[4] $\quad B_a = H(b_1 + b_3[H_0^2 \cos^2 wt. + H^2] +$
$\quad\quad b_5[H_0^2 \cos^2 wt. + H^2]^2 + b_7[H_0^2$
$\quad\quad \cos.^2 wt. + H^2]^3 + \ldots)$ By expanding [4] and substituting for $\cos^n wt$. the equivalent in terms of $\cos n\,wt$., Equation 4 takes the form:

[5] $\quad B_a = F_0[b_i, H_0^{2n}, H^{2n-1}] +$
$\quad\quad F_2[b_i, H_0^{2n}, H^{2n-1}] \cos 2\,wt. +$
$\quad\quad F_4[b_i, H_0^{2n}, H^{2n-1}] \cos 4\,wt. + \ldots$ As is apparent from Equation 5 all odd harmonics in the flux $B_a$ are permanently suppressed and consequently the voltage induced in the pick-up coil in response to an external field axial of the core contains only even order harmonics of the frequency of the excitation current. Each of these terms is proportional to an odd power of $H$ and consequently, as the external field changes sign the preferred direction of rotation of the magnetic domains, as they change direction in response to the exciting field, also changes and the phase of the voltage induced in the pick-up coil changes correspondingly by 180 degrees. Since the output of the transflux magnetometer is zero in the absence of an external field parallel to the core and contains only even order harmonics in the presence of an external field, the presence of harmonics in the excitation current will not produce spurious signals in the output of the transflux magnetometer. Thus, it is not necessary to filter the excitation current to discriminate against harmonic frequencies. Further, it is not necessary to provide complex filters in the output of the transflux magnetometer to separate even harmonics from the odd harmonics, as is required in the longitudinal magnetometer.

Reference is now made more specifically to Fig. 1 of the drawings. An elongated cylindrical core 10 of magnetic material having a bore 11 extending therethrough is provided with a cap 12, of non-magnetic and non-conductive material on one end thereof. An excitation winding 13 is wound in toroidal fashion around the core 10 and cap 12 and is adapted to be energized from a suitable source of A. C. current to thereby create a magnetic field circularly around the magnetic core 10. A pick-up coil 14 is wound about the core 10, and in the absence of an external field parallel to the core, the magnetic domains in the core will reverse direction during every half cycle of the excitation current in random fashion such that the coupling with the pick-up coil is substantially zero under those conditions. Experimentally, it has been ascertained that due to the geometry of the windings, a small coupling may exist between the excitation windings 13 and the pick-up coil 14 for the excitation fundamental frequency. This coupling can be reduced to a negligible amount, under zero external field conditions, by varying the lead of the toroidal excitation windings so as to produce zero output when the external field is zero. For this purpose, the cap 12 may be angularly adjusted on the core 10 to vary the lead of the excitation windings.

When an external field is applied parallel to the core, there is a preferred direction through which the magnetic domains will rotate as the excitation current changes polarity, thereby creating a coupling with the pick-up coil. The output of the pick-up coil is a function of the fraction of the domains which reverse direction, as the exciting current changes polarity, by going through the preferred direction established by the external field, which fraction increases and decreases in accordance with the magnitude of the external field. Thus, the output of the pick-up coil is a voltage which varies in magnitude in accordance with the external field parallel to the core. As hereinbefore set forth, the voltage induced in the pick-up coil contains only even harmonic components in response to an external field parallel to the core and the output of the transflux magnetometer is zero for zero external field. Thus, it is not necessary to employ filters in the excitation circuit, as is required in longitudinal type magnetometers. Further, it is not necessary to employ filters in the output circuits of the transflux magnetometer since the entire output thereof is zero for zero external field and is a voltage containing only even order harmonics which is proportioned to the external field when such a field is applied parallel to the core.

The embodiment illustrated in Fig. 2 includes an elongated core 21 of magnetic material having a bore 22 extending longitudinally thereof. The core is circularly magnetized by an alternating current which flows through a conductor 23 disposed in the bore and electrically insulated from the core as by insulation 24. The operation of the transflux magnetometer illustrated in Fig. 2 is the same as that of the preceding embodiment, the output of the magnetometer being detected by a pick-up coil 25 disposed around the core. However, due to the low impedance of the excitation circuit, special provision must be made for coupling the excitation conductor to the excitation oscillator.

It has been further ascertained that a magnetic wire of conductive material such as "Permalloy" illustrated at 31 in Fig. 3 may be utilized as the sensitive element, the pick-up coil 32 being wound around the conductive magnetic wire 31.

Reference is now made more specifically to Fig. 4 which illustrates a magnetic detecting system of the type to which the magnetometer of the present invention is applicable. The excitation winding 41 for producing the circular magnetic field in the core 42 is energized by way of matching transformer 43 from the oscillator and amplifier circuit 44. Alternatively, the excitation winding may be utilized as the inductance in the tank circuit of an oscillator. As is apparent, the excitation winding may either be a single axial conductor, as illustrated in Figs. 2 and 3, or may be a toroidal winding, as illustrated in Fig. 1. The output of the transflux magnetometer detected by the pick-up coil 45 is applied through matching transformer 46 to a suitable detector circuit 47.

Since the excitation current in the transflux magnetometer is not subjected to the demagnetizing effects as is the case in the longitudinal type magnetometer, comparatively thick walled tubes of the ferrite may be used in the embodiments illustrated in Figs. 1 and 2. In longitudinal type magnetometers excessively large excitation fields would be required to drive thick ferrite cores into saturation due to the demagnetizing effects of the core ends. Since the conductivity of ferrites is low, the circularly directed flux does not generate large eddy currents in the core and as the sensitivity of the magnetometer increases as the cross-sectional area of the core increases, the logical design is to make the cross-section of the ferrite cores in the transflux magnetometer large. However thick walled cores of magnetic materials having high conductivity such as "permalloy" are not suitable for use in the transflux magnetometer because of the large eddy currents which would be generated in the thick walls and hence relatively thin walled cores of such materials are used. Thus, the relative dimensions of the cores illustrated in Figs. 1, 2 and 4 will vary dependent on the core material utilized, cores of electrically conductive magnetic materials such as permalloy being chosen so as to have relatively small cross sectional areas to reduce eddy current effects whereas cores having relatively large cross sectional areas are used with cores of magnetic materials having low conductivity such as ferrites.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A magnetometer comprising an elongated element of saturable magnetic material, means for producing an alternating excitation field circular about the axis of the element, means for producing a signal correlative with the component of the alternating flux longitudinally of the element, and adjustable means mounted coaxially of said elongated element for minimizing the magnetic coupling between the means for exciting the field and the means for producing a signal.

2. A magnetometer comprising an elongated element of saturable magnetic material, means for producing an alternating excitation field circular about the axis of the element, a detector coil disposed axially on the element and adapted to produce an output voltage correlative with the external field parallel to the element, and adjustable means mounted coaxially of said elongated element for minimizing the magnetic coupling between the means for exciting the field and the means for producing a signal.

3. The combination of claim 2 wherein said elongated element is a core having a bore extending axially thereof, said field producing means including a coil wound toroidally on said core.

4. The combination of claim 3 in which said adjustable means comprises an annular member over which the toroidal winding is wound.

References Cited in the file of this patent

UNITED STATES PATENTS

| | | |
|---|---|---|
| 2,446,939 | MacCallum | Aug. 10, 1948 |
| 2,543,843 | Frosch | Mar. 6, 1951 |